Feb. 13, 1968         C. H. LOCH         3,369,112
            RUNWAY CENTERLINE LIGHT
Filed Oct. 12, 1966                    4 Sheets-Sheet 1

WITNESSES
Theodore F. Wrobel
James F. Young

INVENTOR
Charles H. Loch
BY Blair R. Studebaker
ATTORNEY

Feb. 13, 1968   C. H. LOCH   3,369,112
RUNWAY CENTERLINE LIGHT

Filed Oct. 12, 1966   4 Sheets-Sheet 2

Feb. 13, 1968    C. H. LOCH    3,369,112
RUNWAY CENTERLINE LIGHT
Filed Oct. 12, 1966    4 Sheets-Sheet 4

United States Patent Office 3,369,112
Patented Feb. 13, 1968

3,369,112
RUNWAY CENTERLINE LIGHT
Charles H. Loch, Berea, Ohio, assignor to Westinghouse Electric Corporation Pittsburgh, Pa., a corporation of Pennsylvania
Filed Oct. 12, 1966, Ser. No. 586,111
10 Claims. (Cl. 240—1.2)

This invention relates to airport runway lighting and more particularly to a novel optical system for airport runway lights of the centerline, touchdown zone and edge type.

In airport runway centerline lighting it is desirable to project a beam along the centerline of the runway as a means for guiding the pilot during the landing, takeoff and taxiing of aircraft. Formerly, lighting was situated along the edges of the runway in order to guide the pilot. However, such disposition, gave the pilot a feeling of directing the aircraft toward or through an essentially unlit dark pit between rows of light and significantly effected his ability to perceive depths. By situating the lights centrally of the runway this feeling of flying into a dark hole is eliminated. A new problem however, was thus presented by the requirement that the lights be situated directly in the runway. A similar problem is encountered in the touchdown areas of a runway where the pilot might contact the light assembly during landing. These problems have been essentially obviated by designing runway lighting which is essentially flush with the concrete surface of the runway. With the use of the substantially flush mounted runway lighting it is of course desirous to get maximum illumination with a minimum number of lights. In this regard the unidirectional touchdown zone lights are necessarily replaced with bidirectional lights when used in centerline lighting. One such light is disclosed by the present inventor's copending application Ser. No. 472,951, filed July 19, 1965, now Patent No. 3,327,104, for a "Runway Light With Shallow Optical System," which application is owned by the assignee of this invention.

While said copending application represents a significant stride in the perfection of airport runway centerline lighting, improvements which effectively increase the output of the optical system to provide greater light intensities are extremely desirable. Although the present invention will be described with respect to a centerline type light it will be appreciated that the principles thereof are equally applicable to runway touchdown zone and edge type lights.

It is an object of the present invention to provide a highly efficient bidirectional high intensity light.

Another object of the present invention is to provide a high intensity bidirectional light which can be simply and accurately constructed.

A further object of the present invention is to provide an airport runway centerline light of high intensity having a substantially sealed optical system.

Yet another object of the present invention is to provide a runway centerline light which includes an optical system with the component arrangement such that assembly variables are minimized.

The foregoing objects are accomplished in accordance with the present invention by providing a bidirectional high intensity runway light of the runway centerline type in which each of the beams employs at least two reflector areas, one lens, and the prism sealed within an enclosure defined by said reflector and the cover plate of the light fixture to produce substantially horizontal, high intensity, beams of light.

The above described, along with other objects, as well as many of the attendant advantages of the present invention will become more readily apparent as the following detailed description is considered in connection with the accompanying drawings, in which.

Figure 1:
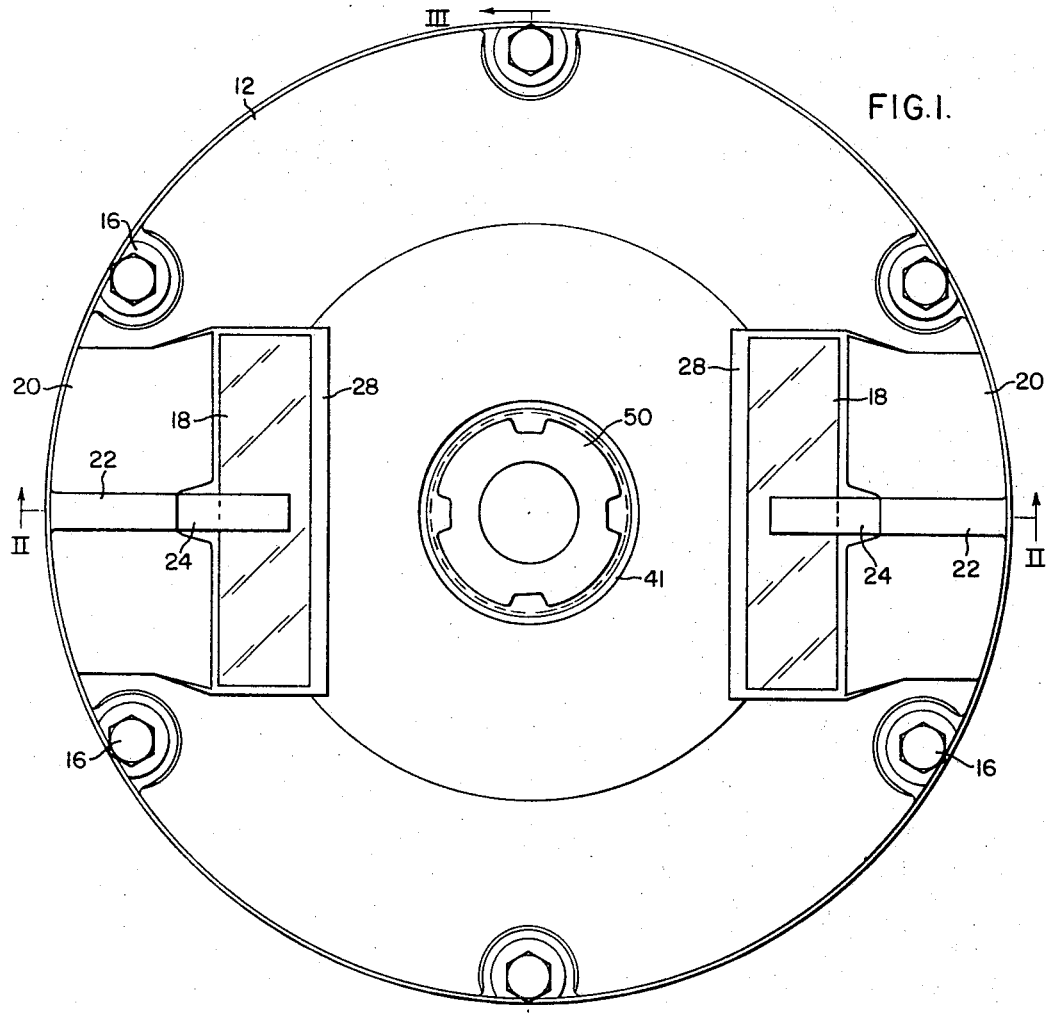
FIGURE 1 is a top plan view of the airport runway centerline light of the present invention.
Figure 2:
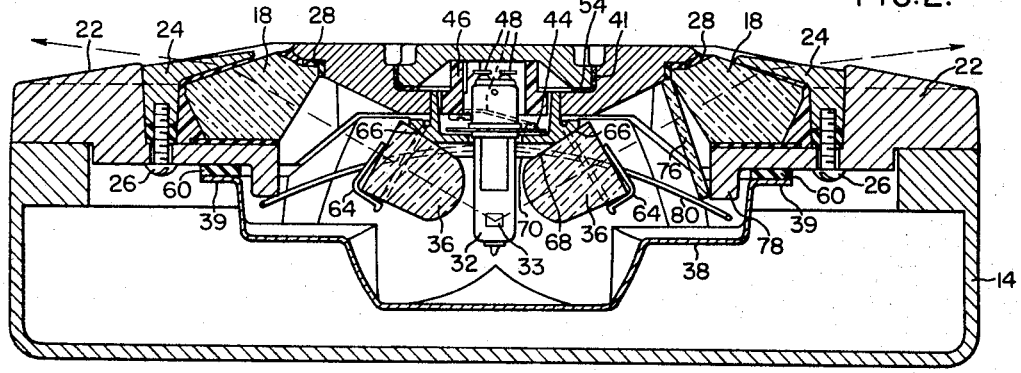
FIG. 2 is a sectional view taken along the line II—II of FIG. 1.
Figure 3:
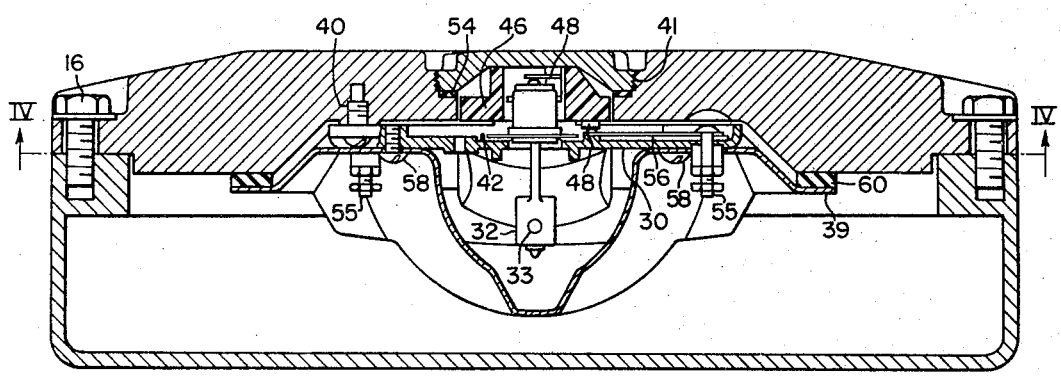
FIG. 3 is a sectional view taken along the line III—III of FIG. 1 and at 90° from FIG. 2.

Referring now in detail to the drawings, wherein like reference characters represent like parts throughout the several views, there is shown in FIGS. 1-3 the general arrangement of the runway centerline light of the present invention. The runway centerline light generally comprises an annular cover plate or housing of a high strength metal casting 12, as for example iron or steel, which is secured to a base member 14 which is in turn embedded in the concrete runway along the centerline thereof. The annular cover plate or housing 12 is secured to the base member 14 by means of a plurality of threaded bolts 16. The top of the base member 14 is positioned approximately ¾ of an inch below the runway surface in order that the maximum height of the cover plate 12 above the runway surface is ½ inch. The runway centerline lights are positioned approximately 50 feet apart with the line II—II bi-secting refracting prisms 18 aligned with the runway centerline.

The top of cover plate 12 includes a pair of troughs 20 adjacent the emergence of the prisms 18 to provide a substantially horizontal plane coplanar with the runway surface from which the beam of light extends. Ribs 22 provide increased strength to the housing and further prevent snowplow blades and aircraft tail-hooks from directly contacting the prisms 18. Rib extensions 24 extend colinearly with each of ribs 22 and overlie the exterior faces of each prism 18. Rib extensions 24 are secured to the cover plate 12 by bolts 26 and serve to clamp and seat the prisms 18 in fixed positions within cover plate 12. The prisms 18 are secured in openings or passages in the cover plate 12 by a silicone rubber sealant 28 and refract the light impinging on their inner surfaces to form a substantially horizontal beam of light from the light exiting on outer surfaces.

Figure 4:
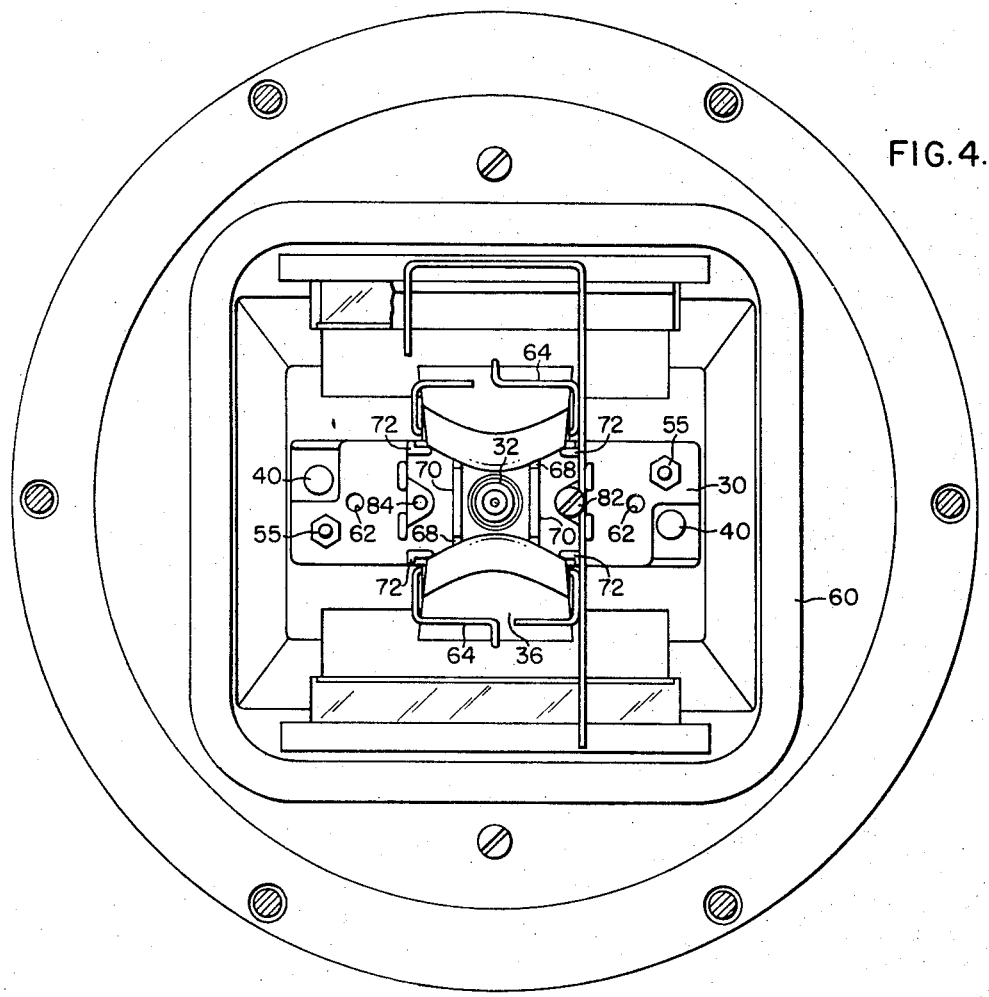
FIG. 4 is a bottom view of the runway light housing assembly with the reflector removed.

Each of the remaining optical elements of the runway centerline light of the present invention are situated with respect to each other by a single support plate 30 (FIG. 4). Each of the remaining optical elements including the lamp 32, the refracting lenses 36 and the reflector 38 are mounted with respect to the cover plate 12 and prisms 18 by means of the support plate 30. The support plate 30 is secured to the underside of cover plate 12 by means of a pair of bolts 40 and bridges an access aperture 41 centrally located in cover plate 12. The illumination source 32 preferably in the form of a single ended quartz-iodine lamp is mounted through an aperture located centerally in the support plate 30 in an inverted position with its elevation determined by the surface 42 of support plate 30 and its azimuth by a plurality of detents or studs 44 which surround the aperture and extend from surface 42 of the support plate. The mounting of the lamp on support plate 30 as well as the electrical connections to the lamp are more completely described in copending application Ser. No. 586,130, filed the same day as this application by the present inventor and owned by the assignee of this invention. Generally this assembly includes a conductor carrying insulator 46 which carries a pair of resilient conductors 48 and surrounds the base of lamp 32. After the lamp 32 has been properly positioned on surface 42 and detents 44 and the ceramic conductor carrying insulator 46 placed therearound a threaded access cap 50 is threaded into opening or access aperture 41 located centrally of the cover plate 12 until the bottom edges thereof seal against a rubberized fiber gasket 54. Electrical contact is thus completed between resilient conductors 48 and the lamp contacts through the depression of insulator 46 by the flat recessed central undersurface of the access cap 50. Electrical connection to the lamp is made by connecting terminals 55 to the power source and the power is thereby conducted through terminals 55, lead-in conductors 56 and resilient conductors 48 to the conventional contact on the base of the lamp.

The reflector 38 is also secured directly to the support plate 30 by bolts 58. The combination of cover plate 12 with its dished out underside and reflector 38 forms an optical cavity or enclosure with the cover plate 12 providing an upper wall and reflector 38 providing a bottom wall. Where it is desired to seal-off the entire optical chamber or cavity a rubber gasket 60 is employed between the lateral flange 39 of the reflector 38 and the underside of cover plate 12. The bolts 58 which secure the reflector 38 to support plate 30 are threaded into holes 62 in the underside of support plate 30. The remaining optical elements, lenses 36 are secured to the support plate 30 by spring clips 64. The top edge of lenses 36 are held by spring clips 64 in an angular relationship to the filament of lamp 32 against sloped surfaces 66 along the sides of the support plate 30 and the sloped portions 68 of raised ribs 70. In order to align the hyperbolic lens 36 the proper focal distance from the filament of lamp 32, raised angular cornerstops 72 abut the inward edges of the lens 36. The combination of the spring clips 64, sloped surfaces 66 and 68 and angular stops 72 serves to exactly position the hyperbolic surface of lens 36 with respect to the filament of lamp 32.

Where it is desired to color-code the light exiting from the outer face of prism 18 a colored glass plate 76 may be positioned adjacent the inner face of prism 18. The colored glass plate 76 is resiliently held against a downwardly extending flange 78 of the cover plate 12 by a resilient spring member 80 which may be secured to the support plate 30 under the heads of bolts 82 which are threaded into threaded apertures 84 on each side of the support plate 30. The spring member 80 is adapted to hold plates 76 adjacent the inner face of one or both of the prisms 18.

Figure 5:
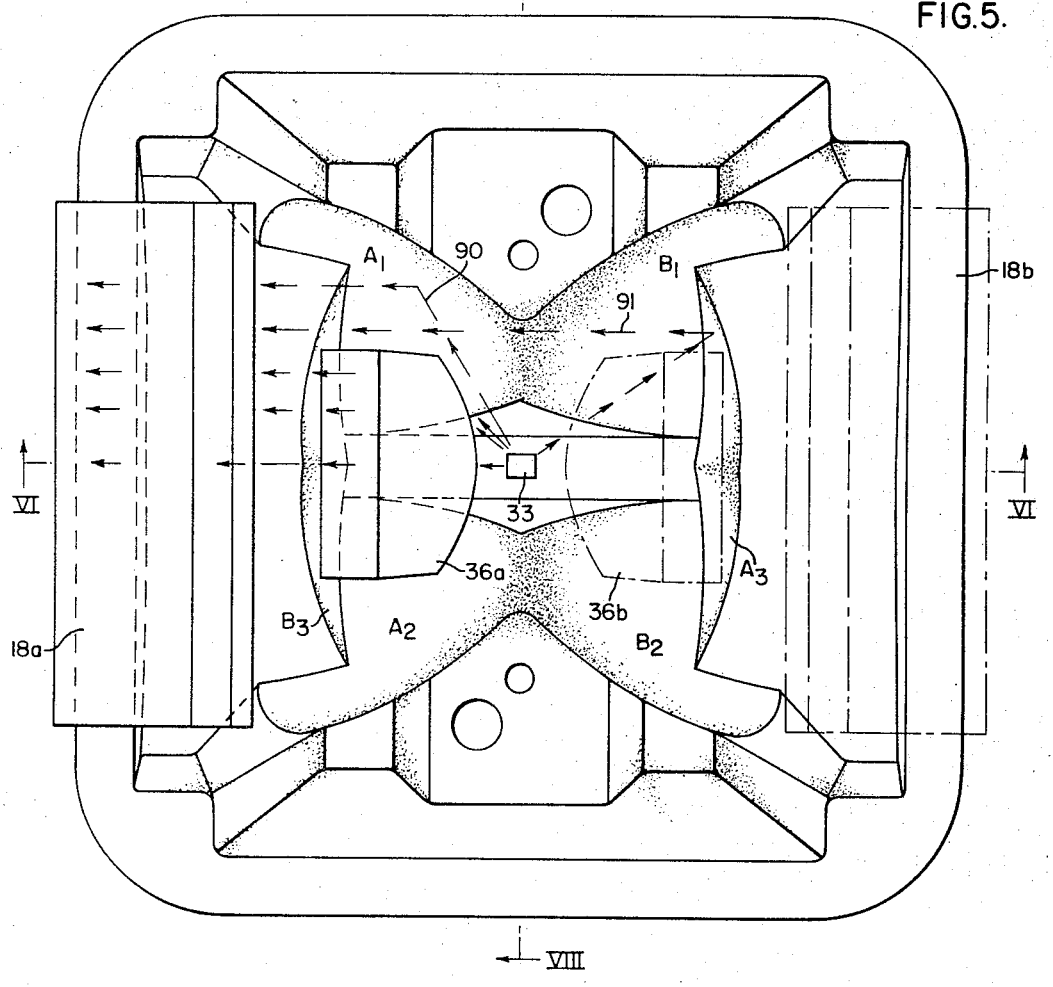
FIG. 5 is a top view looking into the interior of the reflector of the present invention with the other elements of the optical system shown in their relative relationship to said reflector.
Figure 6:
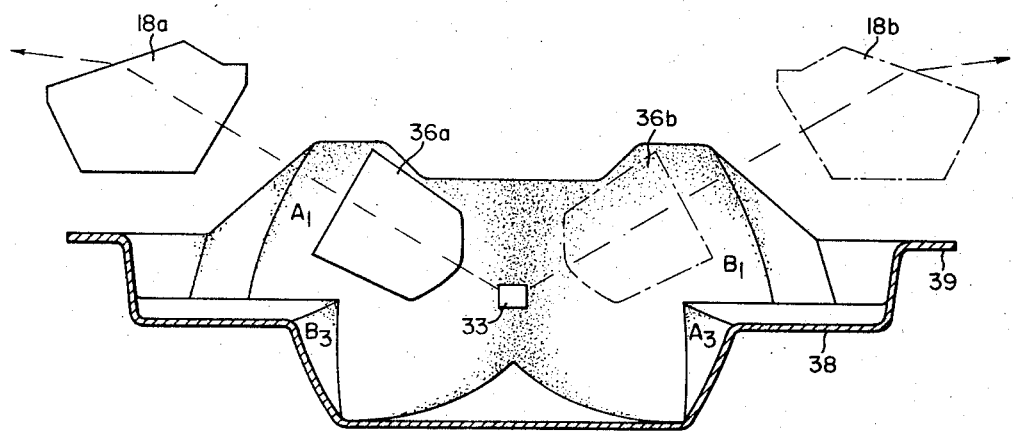
FIG. 6 is a sectional view taken along the line VI—VI of FIG. 5.
Figure 7:
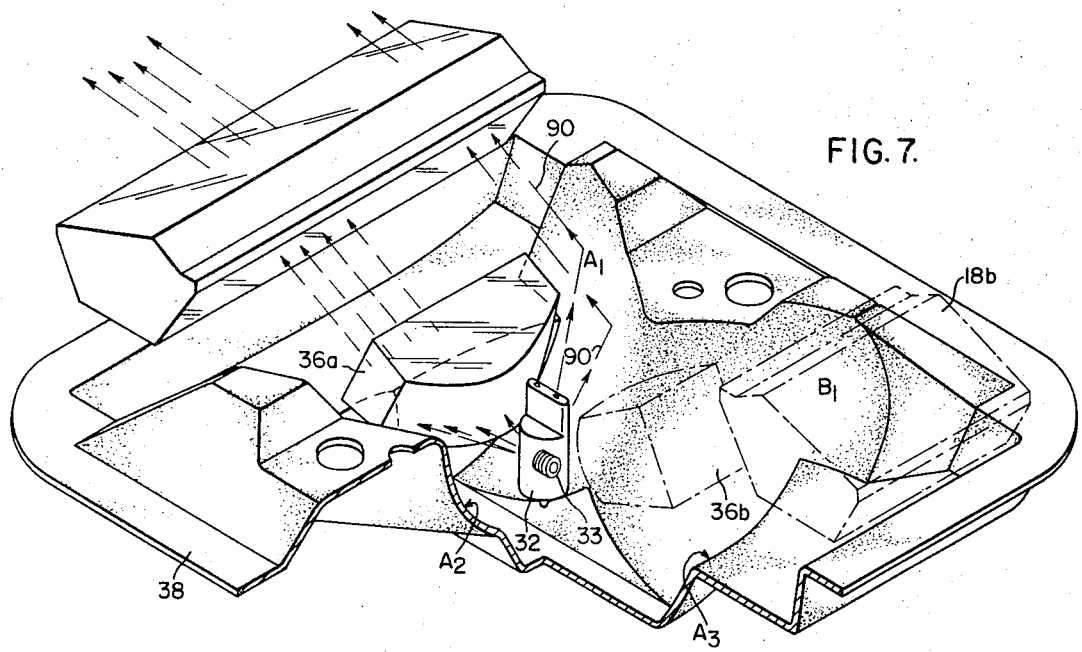
FIG. 7 is a perspective view of the reflector of the present invention with the elements of the optical system illustrated in their spatial relationship to said reflector.
Figure 8:
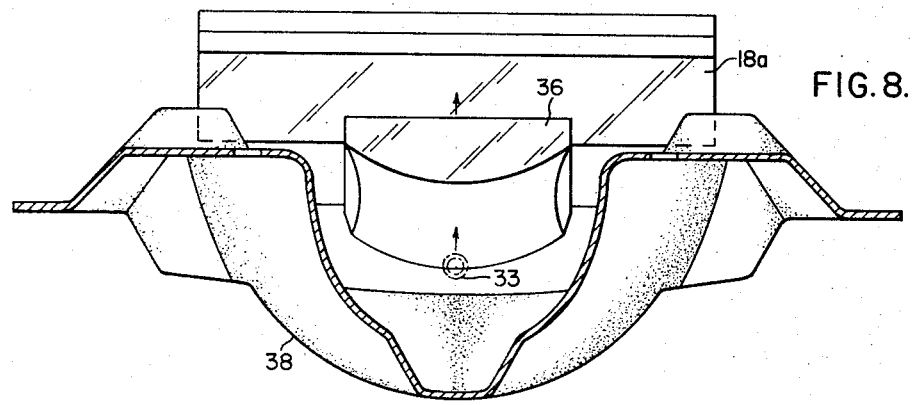
FIG. 8 is an end view of the reflector with a portion thereof broken away and illustrating the relationship of the optical elements to said reflector.

Referring now more particularly to FIGS. 5 through 8, the optical characteristics which permit the runway centerline light of the present invention to provide an optimum light beam will hereinafter be described. The specular reflector 38 is a single piece of stamped aluminum with the polished parabolic reflective surfaces disposed with the filament of lamp 32 as a focal point. The object of the geometric configuration of the optical system is of course to transmit as much of the light generated by the filament of lamp 32 from the outer face of each of the prisms 18. Each lens 36 is so positioned that substantially all of the light from the filament falling on the hyperbolic surface thereof is refracted and directed at the inner face of the adjacent prism 18. Normally, light transmitted from the filament that does not fall on the lens of a runway centerline light is lost. The reflector 38 of the present invention is composed of two primary reflective areas and one secondary reflective area for each of the prisms 18. These reflective areas for the prism designated $18_a$ in FIGS. 5–8 consists of primary reflective surfaces $A_1$ and $A_2$ and secondary reflective surface $A_3$. For the prism at the other end, prism $18_b$, the primary parabolic reflective surfaces are $B_1$ and $B_2$ with $B_3$ being the secondary parabolic reflective surface. The reflective surfaces $A_3$ and $B_3$ are formed by two separate parabolic surfaces which intersect as shown in FIG. 5 along the line VI—VI and give the appearance of a double dish. The arrows representing light rays in the drawings illustrate in FIGS. 5 and 7 how illumination from the filament of lamp 32 is reflected to travel along the line designated 90 from reflective surface $A_1$ and along the line designated 91 from the reflective surface $A_3$. Reflective surfaces $A_2$, $B_1$ and $B_2$ operate in the same manner as reflective surface $A_1$ to reflect rays of light from the filament 33 of lamp 32 substantially as indicated by beam 90. Reflective surface $B_3$ operates in the same fashion as reflective surface $A_3$ to direct beams of light similarly to that shown by beam 91 reflected from the reflective surface $A_3$. As can be seen in FIG. 7 reflective surfaces $A_1$ and $A_2$ are disposed laterally with respect to a line bisecting filament 33 and prism $18_a$ and the reflective surfaces $B_1$ and $B_2$ are likewise disposed laterally of a line bisecting filament 33 and prism $18_b$. The reflective surface $A_3$ is disposed beneath prism $18_b$ but serves to reflect light from filament 33 back through prism $18_a$. The reflective surface $B_3$ also operates in this same mode with respect to prisms $18_a$ and $18_b$ but in reverse.

Figure 9:
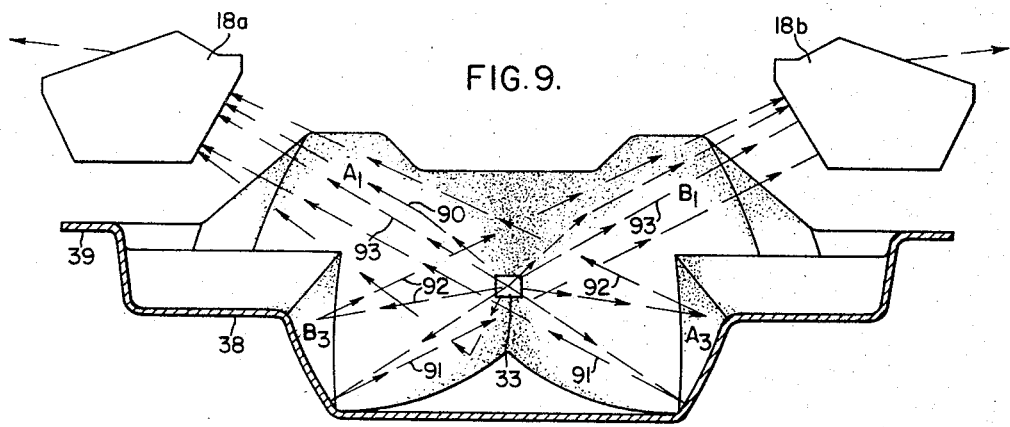
FIG. 9 is a sectional view of the reflector of the present invention similar to FIG. 6 illustrating a different embodiment which does not employ the hyperbolic lenses.

The operation of the airport runway centerline light can be effected at reduced costs with a slight reduction in light output by eliminating the lenses 36 from the light. As shown in FIG. 9, in the embodiment wherein the lenses 36 are eliminated, the parabolic reflective surfaces $A_3$ and $B_3$ are extended upwardly a maximum distance to essentially reflect light which after reflection will pass through the area formerly filled by the lenses 36 as for example, the light beams designated 92 in FIG. 9. In this embodiment all the light passing through prisms $18_a$ and $18_b$ is reflected light except that which is transmitted directly through the prisms $18_a$ and $18_b$ from the lamp 32, for example light beams 93. The light loss through elimination of the lenses $36_a$, $36_b$ is that which normally would impinge on the lateral surfaces of the hyperbolic face of the lenses but would also miss one of the reflectors $A_1$, $A_2$, $B_1$, $B_2$.

As can be seen from the foregoing the centerline runway light of the present invention provides an optical system with minimized assembly variables due to the fact that the position of all the elements thereof are defined by the support plate 30. Furthermore, substantially all of the light generated by the filament of lamp 32 is transmitted through prisms 18 externally of the light unit without significant loss in the optical enclosure. The seals 60, 54 and 28 render the interior of the optical enclosure substantially free from the ingress of water, dirt, etc. in order that the optical system remains clean throughout its operation thus eliminating the tendency for lights of this type to reduce their luminous output due to the buildup of dust, dirt, etc. on the interior optical surfaces.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. An airport runway light for projecting a substantially horizontal light beam bidirectionally along a runway comprising:

(a) a cover plate having an upper face and a cavity formed in the underside thereof;

(b) first and second light refracting means sealed into oppositely disposed passages connecting said cavity with said upper face;

(c) an access aperture centrally located in said upper face and extending into said cavity;

(d) a support plate secured to the underside of said cover plate and bridging said access aperture at its juncture with said cavity;

(e) a light source mounted on said support plate and extending into said cavity, said light source having a light producing filament therein;

(f) means removably secured within said access aperture effectively sealing off said aperture and electrically connecting said light source, and (g) a reflector secured to the underside of said cover plate substantially coextensive with said cavity to define with said cavity an optical enclosure, said reflector having a plurality of parabolic surfaces arranged in predetermined positions with respect to said light source to thereby reflect a substantial portion of the light from said source at and through said light refracting means.

2. An airport runway light according to claim 1 wherein first and second lens means are mounted on said support plate and disposed intermediate said light source and said first and second light refracting means, respectively.

3. An airport runway light according to claim 2 wherein said first and second lens means are secured against sloped surfaces on said support plate and include a hyperbolic face focused on the filament of said light source.

4. An airport runway light according to claim 1 wherein said reflector includes at least two parabolic surfaces of revolution adjacent each of said light refracting means, said surfaces having said filament as a focal point and arranged to reflect light from said filament at and through said adjacent light refracting means.

5. An airport runway light according to claim 4 wherein first and second additional parabolic reflective surfaces of revolution are respectively spaced from said first and second light refracting means a greater distance than said filament and positioned to reflect light from said filament at and through each of said first and second light refracting means respectively.

6. An airport runway light of the recessed fixture type for producing a bidirectional beam along a predetermined axis comprising:

(a) a sealed enclosure defining an optical cavity and having a pair of oppositely disposed light exits in the form of light refracting means sealed into the upper wall of said enclosure;

(b) reflector means forming the bottom wall of said enclosure and sealed to said upper wall, said reflector means including a plurality of parabolic reflective surfaces and;

(c) an inverted light source means extending into said cavity centrally thereof with said parabolic surfaces symmetrically disposed about said light source in predetermined positions to reflect the greater portion of the light emanating from said light source at and through said oppositely disposed light refracting means.

7. An airport runway light according to claim 6, wherein a support plate is mounted centrally within said cavity on said upper wall and said light source means is supported within said cavity on said support plate.

8. An airport runway light according to claim 7 wherein a refracting lens is positioned on said support plate intermediate said light source and each of said refracting means to direct additional light from said light source at and through said light refracting means.

9. An airport runway light according to claim 6 wherein said parabolic reflective surfaces include at least two surfaces laterally disposed with respect to said light source and located adjacent each of said light refracting means.

10. An airport runway light according to claim 9 wherein an additional reflective surface is positioned below each of said refracting means and oriented to direct light from said source at and through the other of said refracting means.

References Cited

UNITED STATES PATENTS

| | | | |
|---|---|---|---|
| 2,184,004 | 12/1939 | Pennow | 240—1.2 |
| 2,934,633 | 4/1960 | Cumming | 240—1.2 |
| 3,015,717 | 1/1962 | Angier | 240—1.2 |
| 3,113,726 | 12/1963 | Pennow et al. | 240—1.2 |
| 3,155,321 | 11/1964 | McDonald | 240—1.2 |

NORTON ANSHER, *Primary Examiner.*

DAVID L. JACOBSON, *Assistant Examiner.*